US006637151B1

(12) United States Patent
Tillman

(10) Patent No.: US 6,637,151 B1
(45) Date of Patent: Oct. 28, 2003

(54) SPRAY SHIELD ASSEMBLY

(76) Inventor: Connie J. Tillman, 2786 Stapleton Dr., Donalsonville, GA (US) 31745

( * ) Notice: Subject to any disclaimer, the term of this patent is extended or adjusted under 35 U.S.C. 154(b) by 0 days.

(21) Appl. No.: 10/086,610

(22) Filed: Mar. 1, 2002

(51) Int. Cl.[7] ............ A01C 15/00; A01G 15/00
(52) U.S. Cl. ............ 47/1.7; 43/900; 239/288; 239/288.5; 47/29.5; 47/23.1
(58) Field of Search ............ 47/1.7, 23.1, 2, 47/20.1, 29.1, 29.6, 69, 29.5, 29.7; 43/900; 4/609; 118/504, 505, 213; 193/1; 220/666, 673, 670; 239/288, 600, DIG. 3, 288.5

(56) References Cited

U.S. PATENT DOCUMENTS

| | | | |
|---|---|---|---|
| 1,805,212 A | * | 5/1931 | Graffenberger |
| 1,814,339 A | * | 7/1931 | Sato |
| 2,928,610 A | * | 3/1960 | Fenimore |
| 3,301,293 A | * | 1/1967 | Santelli |
| 3,935,973 A | * | 2/1976 | Weyn .................. 222/182 |
| 4,199,896 A | * | 4/1980 | Lehman ................ 47/1.7 |
| 4,223,477 A | * | 9/1980 | Abernathy ............. 47/1 R |
| 4,865,257 A | * | 9/1989 | Bailey ................. 239/288.5 |
| 4,986,473 A | * | 1/1991 | Semple et al. .......... 239/104 |
| 5,196,065 A | | 3/1993 | Jozwiak |
| 5,228,621 A | * | 7/1993 | Wilson et al. ........... 239/99 |
| 5,248,090 A | * | 9/1993 | Williamson ............ 239/168 |
| 5,269,428 A | | 12/1993 | Gilbert |
| 5,502,920 A | | 4/1996 | Takaoka |
| 5,526,605 A | | 6/1996 | O'Dougherty |
| D403,587 S | | 1/1999 | Thornley et al. |
| 5,975,432 A | * | 11/1999 | Han ................... 239/526 |
| 6,138,402 A | | 10/2000 | Wotton |
| 6,145,756 A | * | 11/2000 | Kohls ................. 239/288 |
| 6,334,578 B1 | * | 1/2002 | House ................. 239/288.5 |
| 6,453,426 B1 | * | 9/2002 | Copp, Jr. .............. 239/346 |

FOREIGN PATENT DOCUMENTS

JP         404102544 A * 4/1992 ............ B65D/8/12

* cited by examiner

Primary Examiner—Peter M. Poon
Assistant Examiner—Andrea M. Valenti

(57) ABSTRACT

A spray shield assembly for providing an expandable spray shield connectable to a variety of sprayer types. The spray shield assembly includes a shield member having an accordion section to permit expanding a length of the shield member. The spray shield assembly includes a plurality of interchangeable lids, each lid being designed for attachment to a particular type of sprayer including a garden hose type sprayer and a bottle type sprayer.

1 Claim, 3 Drawing Sheets

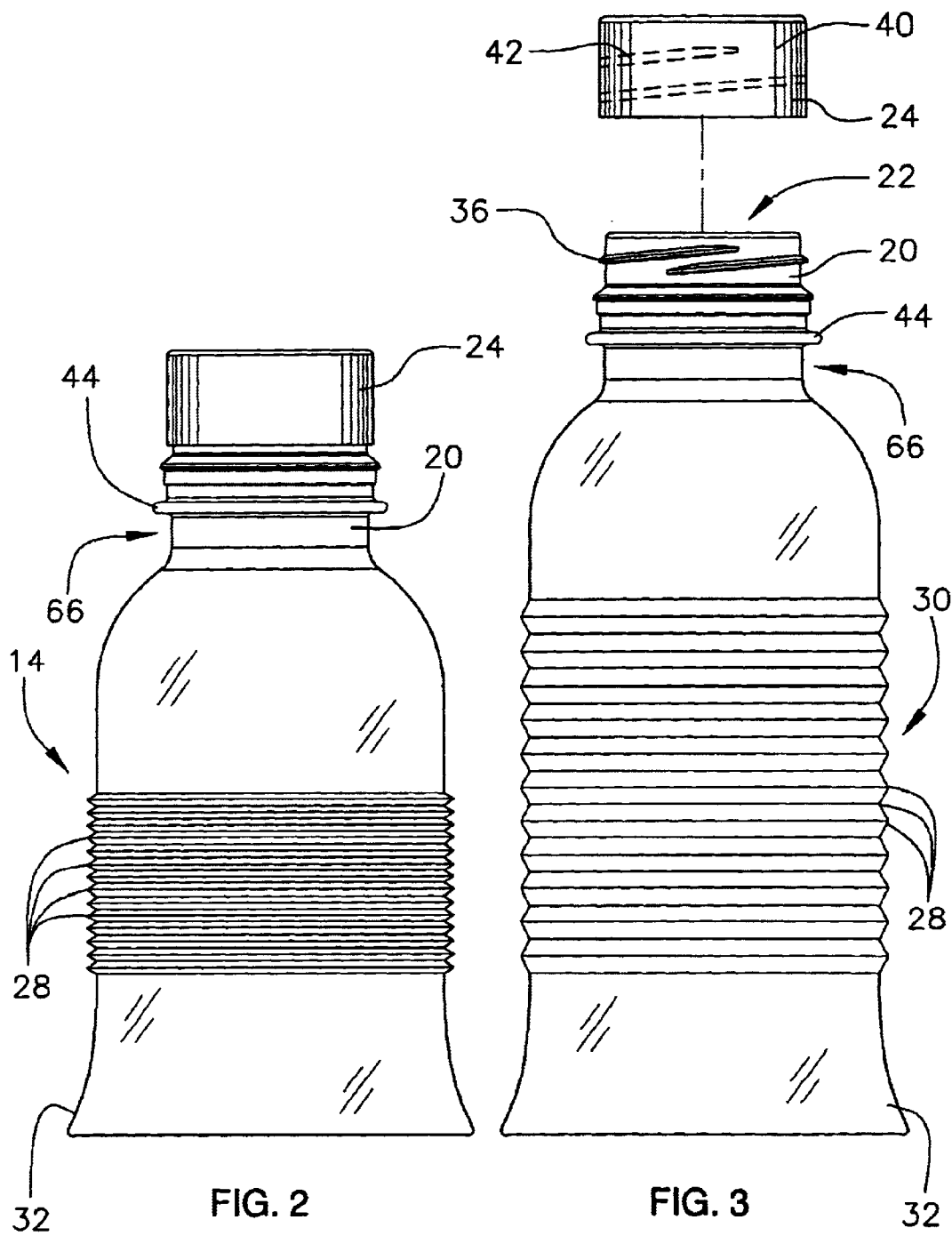

SPRAY SHIELD ASSEMBLY

BACKGROUND OF THE INVENTION

1. Field of the Invention

The present invention relates to sprayer shields and more particularly pertains to a new spray shield assembly for providing an expandable spray shield connectable to a variety of sprayer types.

2. Description of the Prior Art

The use of sprayer shields is known in the prior art. U.S. Pat. No. 5,526,605 describes a complex system for moving a non-expandable spray shield along a row of plants. Another type of sprayer shield is U.S. Pat. No. 5,196,065 showing a non-expandable garden sprayer shield with a top that is flared outwardly. U.S. Pat. No. 5,502,920 discloses a non-expandable shield. U.S. Pat. No. 5,269,428 discloses a container that has an expandable portion for adjusting the volume of the container. U.S. Pat. No. Des. 403,587 shows an ornamental appearance for an expandable container.

While these devices fulfill their respective, particular objectives and requirements, the need remains for a spray shield that attaches to a variety of sprayer types and also includes an expandable section to permit placement of the spray shield directly over plants having various heights.

SUMMARY OF THE INVENTION

An object of the present invention is to provide a new spray shield assembly that connects to various types of sprayers.

Even still another object of the present invention is to provide a new spray shield assembly that is positionable directly over a plant to dispense water from the sprayer directly to that plant.

Yet still another object of the invention is to provide an expandable section of the sprayer to permit placement over tall and short plants while permitting easy handling of the spray shield.

To this end, the present invention generally comprises a shield member having an accordion section to permit expanding a length of the shield member. The spray shield assembly includes a plurality of interchangeable lids, each lid being designed for attachment to a particular type of sprayer including a garden hose type sprayer and a bottle type sprayer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the present invention.

FIG. 3 is a side view of the present invention.

DESCRIPTION OF THE PREFERRED EMBODIMENT

Figure 1:
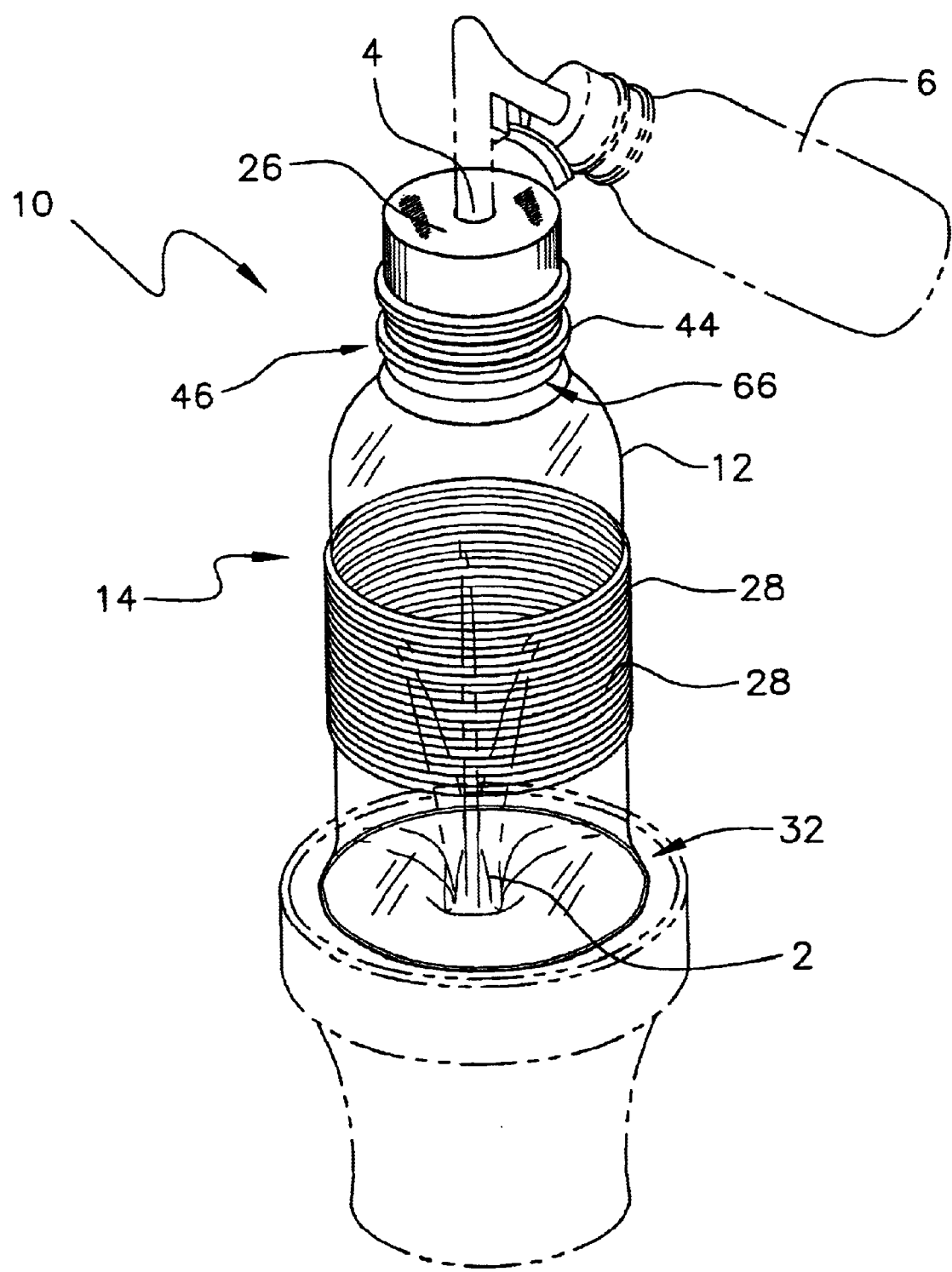
FIG. 1 is a perspective view of a new spray shield assembly according to the present invention.
Figure 4:
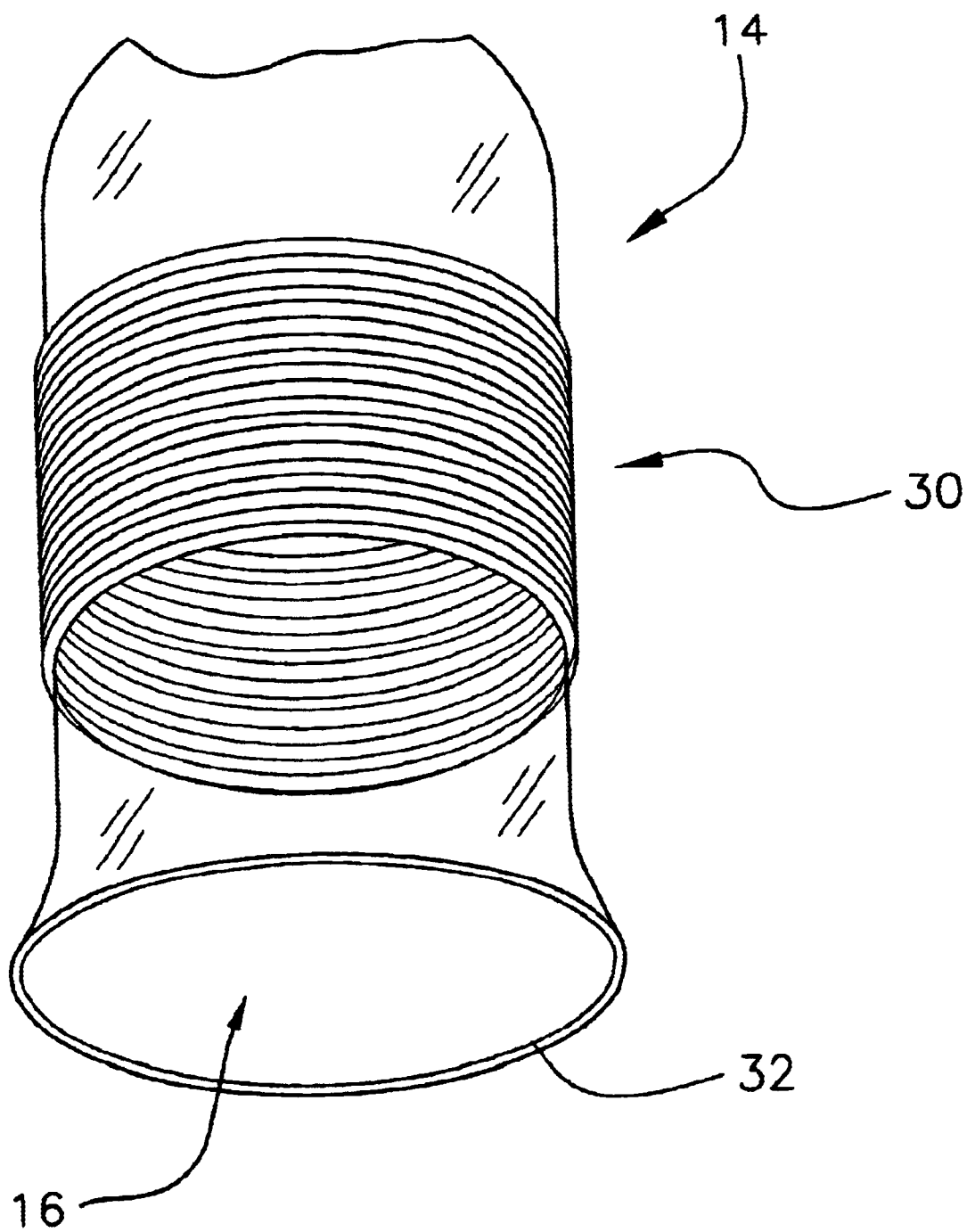
FIG. 4 is a perspective view of the bottom of the shield member of the present invention.

With reference now to the drawings, and in particular to FIGS. 1 through 4 thereof, a new spray shield assembly embodying the principles and concepts of the present invention and generally designated by the reference numeral 10 will be described.

As best illustrated in FIGS. 1 through 4, the spray shield assembly 10 generally comprises a shield member 12 that includes a tubular main body portion 14 and an open bottom 16 such that the shield member 12 is designed for positioning over a plant 2 such that the plant 2 is positioned within the shield member 12. The shield member 12 includes a perimeter wall 20 extending around an open top 22 of the shield member 12.

A lid 24 is couplable to the perimeter wall 20. The lid 24 includes a central aperture 26 adapted for frictionally engaging a nozzle 4 of a sprayer 6 inserted into the central aperture 26.

The shield member 12 includes a plurality of folds 28 extending around the shield member 12 in a central region of the main body portion 14 forming an accordion region 30 such that the shield member 12 is gradually and fixedly increasable in length. In an embodiment, the length of the accordion region 30 is expandable from 4 inches to 10 inches. Further, the folds 28 are structured according to known methods such that some resistance to expansion and contraction is provided to prevent unintended changes in length during use.

The lid 24 may be one of a plurality of interchangeable lids 24. Each interchangeable lid 24 includes a central aperture 26 configured for frictionally engaging a unique nozzle shape compared to each other interchangeable lid 24.

A bottom portion 32 of the spray shield member 12 is flared outwardly for facilitating placement of the shield member 12 over the plant 2.

In an embodiment, the perimeter wall 20 of the shield member 12 includes exterior surface threading 36. A perimeter wall 40 of each lid 24 includes interior surface threading 42 complimentary to the exterior surface threading 36 whereby each lid 24 is securable to the shield member 12.

An annular lip 44 extends around a lower portion 46 of the perimeter wall 20 for reinforcing the perimeter wall 20. The annular lip 44 is positioned in spaced relationship to the main body portion 14 for forming a gripping area 66 for facilitating securement and removal of each lid 24.

In use, the appropriate lid is selected for the type of sprayer to be used. The lid is secured to the shield member and the shield member is adjusted to a desired length to permit easy handling while significantly covering the plant being sprayed. The nozzle of the sprayer is inserted into the central aperture of the lid. The shield member is then placed over the plant and the sprayer is used to spray the plant.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A spray shield assembly comprising:

a shield member having a tubular main body portion and an open bottom such that said shield member is adapted for positioning over a plant such that the plant is positioned within the shield member, said shield member having a perimeter wall extending around an open top of said shield member;

a lid couplable to said perimeter wall, said lid having an central aperture adapted for frictionally engaging a nozzle of a sprayer inserted into said central aperture;

said shield member having a plurality of folds extending around said shield member forming an accordion region such that said shield member is gradually and fixedly increasable in length;

said lid being one of a plurality of interchangeable lids, each interchangeable lid having a central aperture configured for frictionally engaging a unique nozzle shape compared to each other interchangeable lid;

a bottom portion of said spray shield member being flared outwardly for facilitating placement of said shield member over the plant;

said perimeter wall of said shield member having exterior surface threading;

a perimeter wall of each said lid having interior surface threading complimentary to said exterior surface threading whereby each said lid is securable to said shield member;

an annular lip extending around a lower portion of said perimeter wall for reinforcing said perimeter wall;

said annular lip being positioned in spaced relationship to said main body portion for forming a gripping area for facilitating securement and removal of each said lid.

* * * * *